(12) United States Patent
Zeigen et al.

(10) Patent No.: US 11,620,173 B2
(45) Date of Patent: Apr. 4, 2023

(54) OPTIMIZING APPLICATION PERFORMANCE WITH MACHINE LEARNING

(71) Applicant: Slack Technologies, Inc., San Francisco, CA (US)

(72) Inventors: Jenna Zeigen, Brooklyn, NY (US); Natalie Qabazard, Santa Rosa, CA (US); Anuj Nair, Berkeley, CA (US); Aaron Maurer, Washington, DC (US); Yiling Chen, Oakland, CA (US)

(73) Assignee: Slack Technologies, LLC, San Francisco, CA (US)

( * ) Notice: Subject to any disclaimer, the term of this patent is extended or adjusted under 35 U.S.C. 154(b) by 98 days.

(21) Appl. No.: 17/213,707

(22) Filed: Mar. 26, 2021

(65) Prior Publication Data

US 2022/0308981 A1    Sep. 29, 2022

(51) Int. Cl.
| | |
|---|---|
| *G06F 11/00* | (2006.01) |
| *G06F 11/34* | (2006.01) |
| *G06N 20/00* | (2019.01) |

(52) U.S. Cl.
CPC .......... *G06F 11/004* (2013.01); *G06F 11/008* (2013.01); *G06F 11/3476* (2013.01); *G06F 11/3495* (2013.01); *G06N 20/00* (2019.01)

(58) Field of Classification Search
CPC .. G06F 11/004; G06F 11/008; G06F 11/3476; G06F 11/3495; G06N 20/00
See application file for complete search history.

(56) References Cited

U.S. PATENT DOCUMENTS

| | | | |
|---|---|---|---|
| 10,528,916 B1* | 1/2020 | Taylor | G06N 5/01 |
| 11,327,825 B2* | 5/2022 | Acar | G06N 20/00 |
| 11,544,724 B1* | 1/2023 | Wick | G06Q 30/0202 |
| 2017/0200205 A1* | 7/2017 | Liu | G06N 20/00 |
| 2018/0287982 A1 | 10/2018 | Draeger et al. | |
| 2019/0043070 A1* | 2/2019 | Merrill | G06N 20/20 |
| 2021/0117256 A1* | 4/2021 | Bridges | G06F 11/004 |
| 2021/0303381 A1* | 9/2021 | Baldassarre | G06F 11/008 |
| 2021/0342204 A1* | 11/2021 | Choudhury | G06F 11/008 |

(Continued)

OTHER PUBLICATIONS

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Joshua P Lottich
(74) *Attorney, Agent, or Firm* — Erise IP, P.A.

(57) ABSTRACT

Media, methods, and systems are disclosed for optimizing performance of a running application in connection with a group-based communication system. Log data is collected regarding prior metrics for applications that have encountered performance events. Application state information is monitored and a machine-learning model mapping application metrics to performance outcomes predicts whether the running application will encounter a performance event. The machine-learning model mapping application metrics to performance outcomes is trained based on the collected logs. Based on whether a degradation outcome will be impactful, an application performance parameter may be degraded.

20 Claims, 5 Drawing Sheets

(56) References Cited

U.S. PATENT DOCUMENTS

2022/0075676 A1\* 3/2022 Olson .................. G06N 20/00

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advancelexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL https://www.rfc-editor.org/rfc/rfc1459.txt>. (dated May 1993) 57 pages.

Rebecca Walberg, "Email biggest office waste of time: survey", National Post, At FP10, LexisNexis, https://advancelexis.com/api/permalink/96268e3f-26ad-48ac-a98f-6c39804ebded/?context=1000516, (dated Mar. 4, 2014) 2 pages.

Robert Hof, "Stewart Butterfield on How Slack Became A $2.8 Billion Unicorn", FORBES, [online][retrieved May 9, 2019], Retrieved from the Internet: <URL https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

OPTIMIZING APPLICATION PERFORMANCE WITH MACHINE LEARNING

TECHNICAL FIELD

Embodiments of the invention relate to optimizing application performance. More specifically, certain embodiments of the invention relate to optimizing client application performance utilizing machine learning models trained on aspects of application usage.

Client applications that receive a multitude of real-time events may experience performance issues for various reasons. For example, when a number of real-time events received at a client process associated with a client user interface exceeds a capacity of the client process to handle the incoming events, processing of the events will be delayed. Where a client process cannot keep up with a necessary window of event processing throughput, the incoming events will cause an associated incoming event queue to grow, and the events will be processed on a delayed basis or certain events may even be lost if an associated queue overflow occurs. Accordingly, any display associated with a delayed (or lost) incoming real-time event will be delayed or otherwise not perform as desired. When a client process becomes overloaded from processing incoming events, the client process may not be able to perform other processing requirements. This typically manifests itself as a lagging interactive response time to user input, such as a lagging response to character input or to switching focus from one user input component to another. In addition to not being able to process events as quickly as they are received, data stores associated with incoming events may grow too large for the available memory allocated (or otherwise available) for the associated data stores. In either case, a client application may exhibit unacceptable interactive response times or crash. One possible solution would be to impose arbitrary limits on a number of incoming real-time events and/or to only store an arbitrary maximum number of data items in data stores associated with the application, by ignoring excess events or instructing the event source to send fewer events. Such arbitrary restriction on input events and/or storage of associated event information may result in receiving unneeded information and/or not receiving certain information that is important to a user of the client application. Such performance problems are particularly pronounced in the context of a group-based communication system client interface connected to a multitude of workspaces each of which is generating a multitude of real-time events and where a user of the group-based communication system may not presently be engaged with a significant portion of the multitude of workspaces.

What is needed, therefore, is an intelligent way to determine which events to receive and store so that the information that is of use to a user of the application continues to be received and stored without overloading the client application.

SUMMARY

Embodiments of the invention address the above-identified problems by providing mechanisms for optimizing client application performance utilizing machine learning models trained on aspects of application usage. In particular, in a first embodiment, the invention includes one or more non-transitory computer-readable media storing computer-executable instructions that, when executed by a processor, perform a method for optimizing performance of a running application in connection with a group-based communication system, the method comprising: collecting log data relating to prior performance of the running application in connection with the group-based communication system, monitoring application state information regarding an application state of the running application, based the application state information and a machine-learning model mapping application metrics to performance outcomes, predicting a future performance event associated with the running application, wherein the machine-learning model mapping application metrics to performance outcomes is trained based on collected information associated with the collected log data, and responsive to determining at least one impactful outcome for the future performance event and at least one non-impactful outcome for the future performance event, adjusting at least one application performance parameter affecting the metric to degrade the at least one non-impactful outcome without degrading the at least one impactful outcome.

In a second embodiment, the invention includes a method for optimizing performance of a running application in connection with a group-based communication system, the method comprising: collecting log data relating to prior performance of the running application in connection with the group-based communication system, monitoring application state information regarding an application state of the running application, based the application state information and a machine-learning model mapping application metrics to performance outcomes, predicting a future performance event associated with the running application, wherein the machine-learning model mapping application metrics to performance outcomes is trained based on collected information associated with the collected log data, and responsive to determining at least one impactful outcome for the future performance event and at least one non-impactful outcome for the future performance event, adjusting at least one application performance parameter affecting the metric to degrade the at least one non-impactful outcome without degrading the at least one impactful outcome.

In a third embodiment, the invention includes a system comprising at least one processor and at least one non-transitory memory storing computer executable instructions that when executed by the processor cause the system to carry out actions comprising: collecting log data relating to prior performance of a running application in connection with a group-based communication system, monitoring application state information regarding an application state of the running application, based the application state information and a machine-learning model mapping application metrics to performance outcomes, predicting a future performance event associated with the running application, wherein the machine-learning model mapping application metrics to performance outcomes is trained based on collected information associated with the collected log data, and responsive to determining at least one impactful outcome for the future performance event and at least one non-impactful outcome for the future performance event, adjusting at least one application performance parameter affecting the metric to degrade the at least one non-impactful outcome without degrading the at least one impactful outcome.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system. A group-based communication system object may include any instance of communication data within a group-based communication system. Communication data and other content within a group-based communication system is also referred to generally as group-based communication system content.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operational Environment for Embodiments of The Invention

Figure 1:
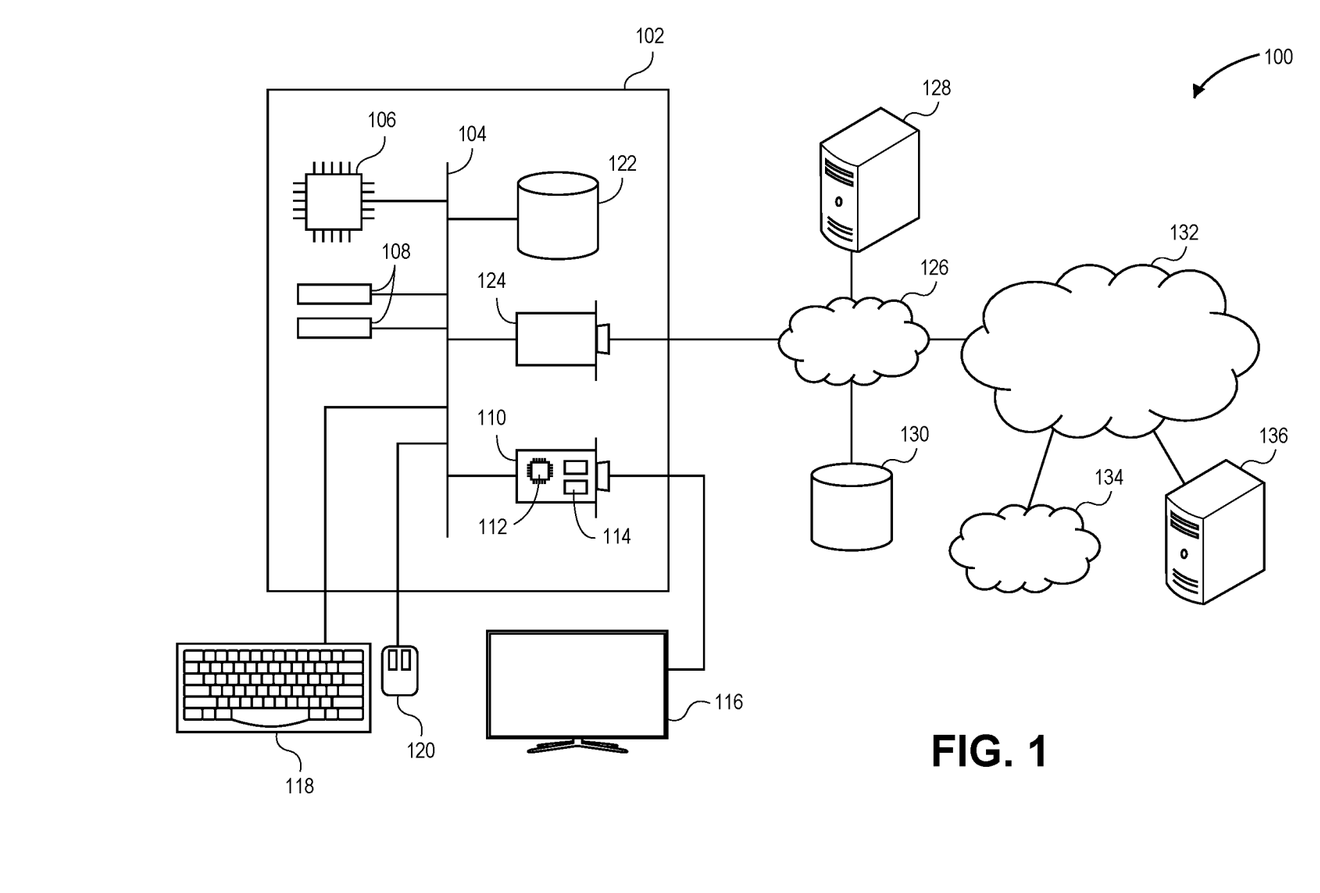
FIG. 1 depicts an exemplary hardware platform for certain embodiments of the invention.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, via which other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the Institute of Electrical and Electronics Engineers (IEEE) 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 2:
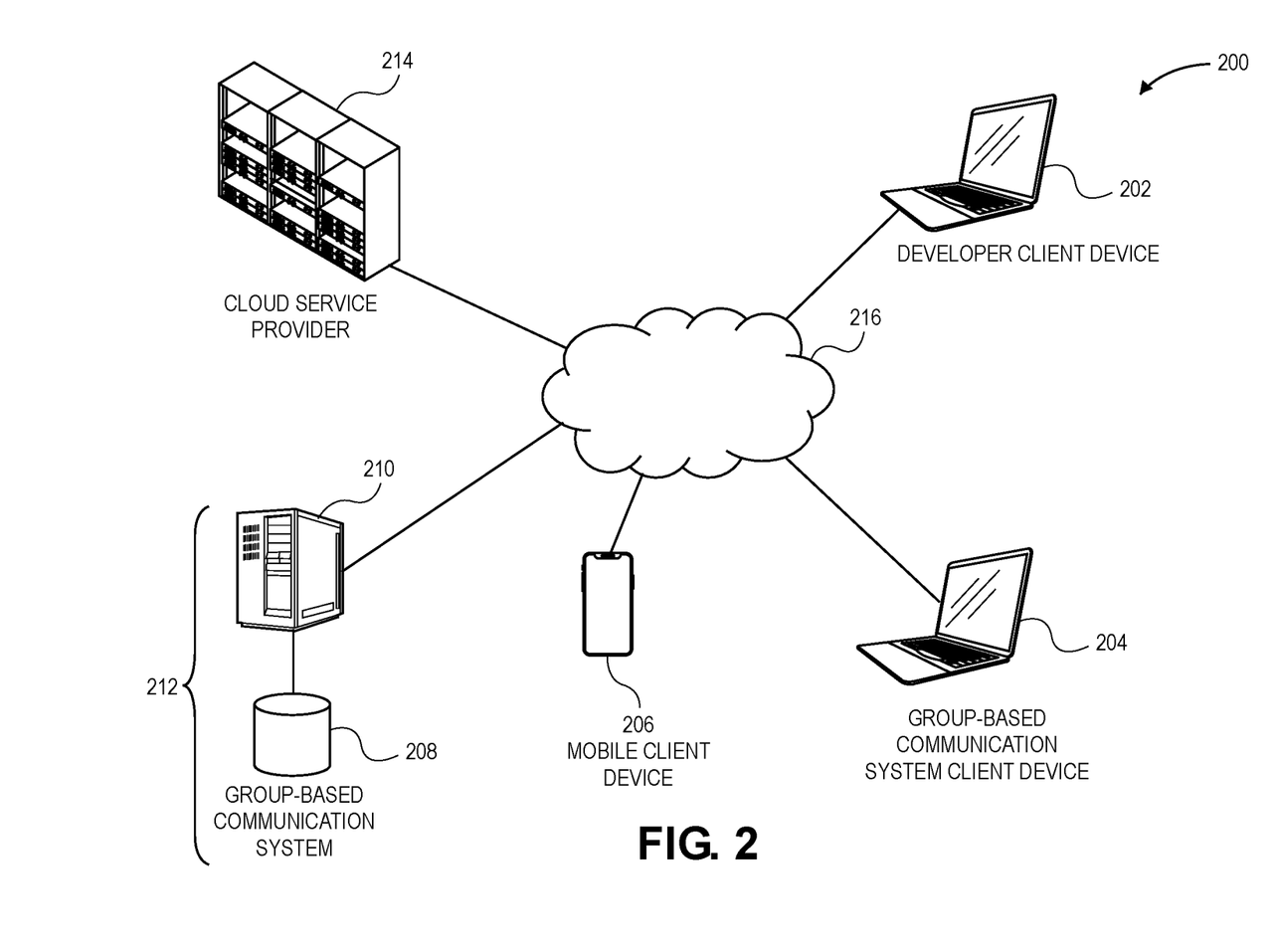
FIG. 2 depicts components of a system for carrying out embodiments of the invention.

Turning now to FIG. 2, an exemplary diagram illustrating components of a system for carrying out embodiments of the invention is depicted and referred to generally by reference numeral 200. System 200 provides a platform for interacting with one or more group-based communication systems. System 200 includes any number of client devices such as group-based communication system client device 204, mobile client device 206, and developer client device 202. An individual user may connect to components of system 200 using a single client device or multiple client devices, either concurrently or sequentially. Similarly, in some embodiments, multiple users may share (concurrently or sequentially) a single client device to access the group-based communication system. As depicted in FIG. 2, client devices may be any form of computing device discussed above with respect to FIG. 1. In particular, a user may access components of system 200 using a desktop, a laptop, or a mobile device. Components of system 200 may be accessible via dedicated software of a particular client device or via a web browser associated with the client device. In some embodiments, developers and application hosting system administrators can access administrative functionality via any client device. In other embodiments, administrative functions can only be accessed from a limited subset of client devices (for example, only via developer client device 202). In some embodiments, group-based communication system 212 is a channel-based messaging platform that can host a multiplicity of group-based communication system servers and group-based communication data stores such as group-based communication system server 210 and group-based communication data store 208.

In some embodiments, group-based communication system 212 provides services in connection with group-based communication system server 210. Group-based communication system server 210 may be a dedicated server, a shared server, a virtual machine instance in a cloud computing environment, or any other form of computing device discussed above with respect to FIG. 1. Although a single group-based communication system server 210 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons.

Cloud service provider 214 represents an on-demand cloud computing platform providing data storage and computing resources in the form of dedicated servers, shared servers, virtual machine instances in a cloud computing environment, or any other form of computing device discussed above with respect to FIG. 1. Cloud service provider 214 may provide software as a service (SaaS), infrastructure as a service (IaaS) or platform as a service services (PaaS), including serverless execution in an event-driven serverless execution environment. In some embodiments machine learning computations may be performed in connection with cloud service provider 214 including training of an associated machine learning model.

Group-based communication system server 210 is communicatively coupled to client devices 202, 204, and 206 as well as cloud service provider 214 via network 216. Network 216 may be a local area network (LAN), wide-area network (WAN), virtual private network (VPN) or the Internet. Broadly speaking, any type of network for providing communication between the various components of system 200 is contemplated. Group-based communication system server 210 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 208 is communicatively connected to group-based communication system server 210. As depicted, group-based communication system data store 208 is directly connected to group-based communication system server 210; however, any form of communicative connection (for example, network-attached storage (NAS), a network file system (NFS), or cloud-based storage) can be employed. Broadly speaking, group-based communication system data store 208 stores all of the durable information used by group-based communication system server 210. For example, group-based communication system data store 208 may store all of the messages with their associated channels, documents and images uploaded to particular channels, channel membership information, and/or user information. As previously discussed, multiple group-based communication system servers may be present in system 200. In such embodiments, each group-based communication system server may have its own copy of group-based communication system data store 208. Alternatively, multiple group-based communication system servers may share a single network-attached group-based communication system data store. Alternatively, or in addition, in any of these embodiments, data may be sharded across multiple group-based communication system data stores. An overall corpus of group-based communication content contained within one or more group-based communication system data stores is referred to as a group-based communication system repository.

Figure 3A:
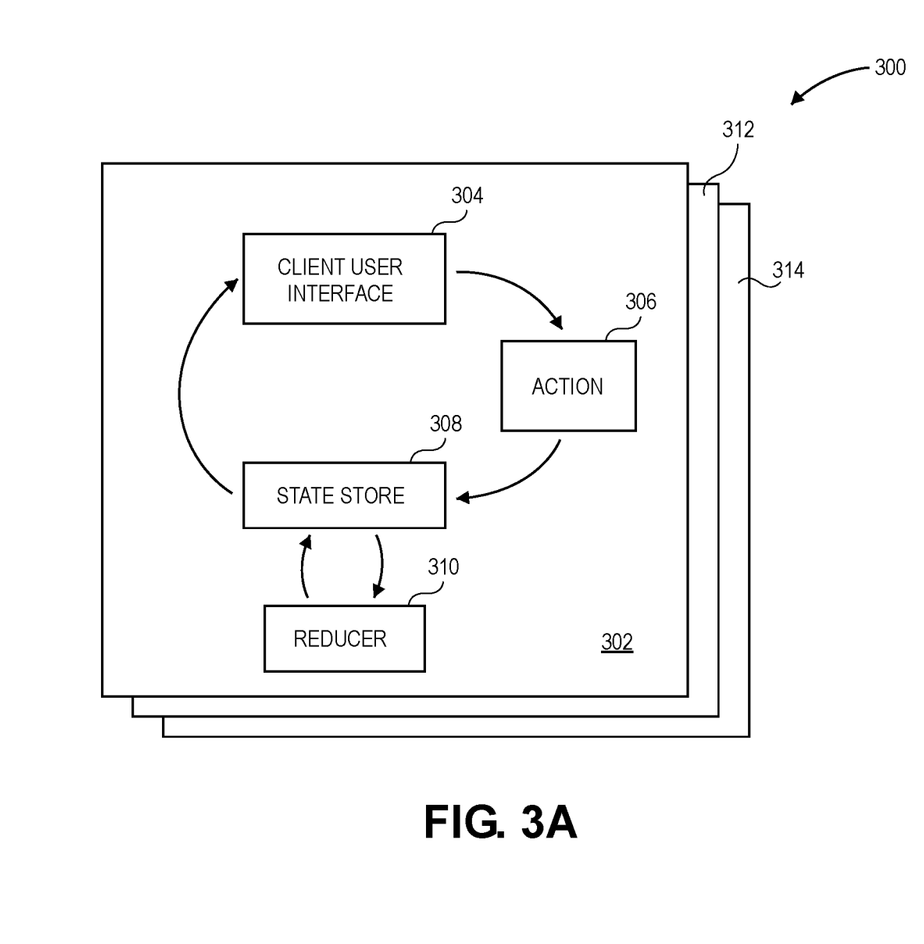
FIG. 3A depicts a browser application framework for carrying out embodiments of the invention.

Turning now to FIG. 3A, a browser application framework 300 is depicted for carrying out embodiments of the invention. In some embodiments, a group-based communication system client application is implemented as an application that executes within a web browser rendering engine in connection with a runtime library, such as Node.js. In some such embodiments, the client application is implemented in connection with a template-based script library for building user interfaces. In some embodiments, templates, code, and markup (including style sheets) are transmitted from a group-based communication system to the web browser rendering engine. In these embodiments, the application is executed in a web browser that implements browser application framework 300. In other embodiments, the application is executed in a native application built in connection with a software framework that employs a web browser content rendering engine that implements browser application framework 300. In some such alternative embodiments, the application may be a native mobile application or a native desktop application. In some embodiments, native applications are built in connection with a cross-platform application development platform that employs a browser rendering engine that can execute in connection with a template-based script library for building user interfaces. In other embodiments, native applications are developed according to platform-specific application frameworks in order to leverage platform-specific features in an optimized manner.

Figure 3B:
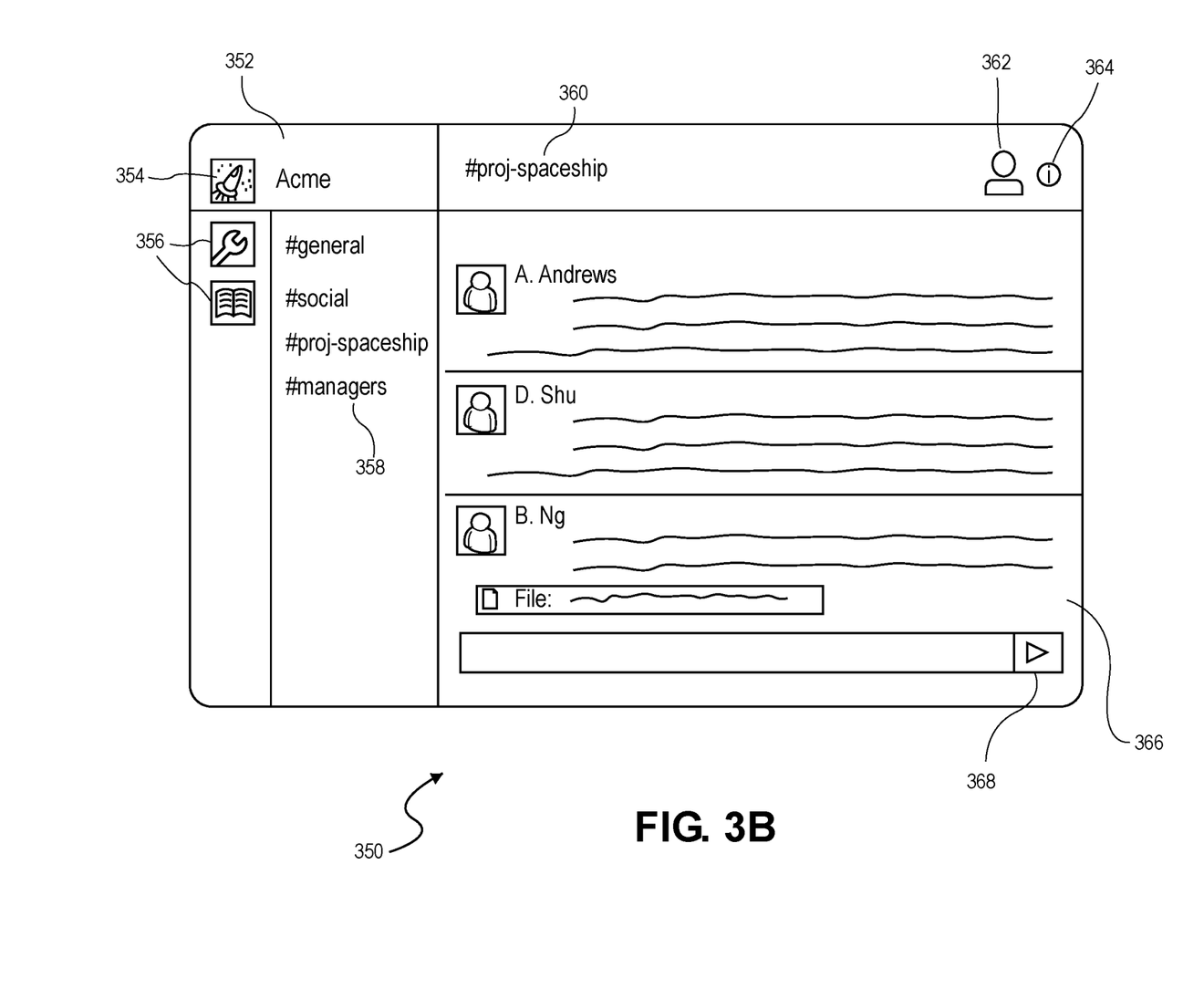
FIG. 3B depicts a user interface window for carrying out embodiments of the invention.

In some embodiments, a plurality of sets of processes and resources associated with browser application framework 300 implement a group-based communication system client interface. In one embodiment a single process 302 implements a group-based communication system client interface. In this embodiment, the client user interface is rendered in connection with a user interface window as depicted in FIG. 3B, described below. In rendering client user interface 304, process 302 receives real-time events from event sources such as from a group-based communication system. Other events include user interactions such as keystroke inputs, mouse movements, mouse clicks, or mobile user interface gestures such as taps or multi-touch gestures.

Any such event received at client user interface 304 that needs to be processed within process 302 may be processed in connection with one or more actions such as action 306. In some embodiments, action 306 is an object having a type attribute and a payload attribute. In this embodiment, the type attribute contains a designation of the type of event described above that corresponds to the action, such as the type of real-time event received from a group-based communication system. Similarly, the payload attribute corresponds to specific content associated with the event such as the content associated with the real-time event, which could correspond to an event having been received in a particular group-based communication system workspace and channel, for example.

In this embodiment, the action causes state store 308 associated with process 302 to be updated. In some embodiments, state store 308 is updated in connection with one or more reducers such as reducer 310. In some embodiments, reducer 310 is a function that receives a current state of state store 308 and an action 306 and based on a type associated with the type attribute of action 306 immutably updates the state of state store 308. In this embodiment, reducer 310 is an event handler for a particular action type corresponding to action 306.

Within process 302, when portions of state store 308 are added or otherwise modified, corresponding changes are reflected in client user interface 304. In some embodiments, components associated with client user interface 304 subscribe to types of data within state store 308 so that any changes occurring to such a subscription will cause selective refreshing of client user interface 304. In some other embodiments, any change to state store 308 causes a refresh to any visible portions of client user interface 304. In some other embodiments, client user interface 304 is periodically completely refreshed if any change has occurred within state store 308.

In some embodiments, a multitude of group-based communication system workspaces and channels and associated group-based communication system objects are accumulated in state store 308. In some embodiments, an unlimited number of group-based communication system workspaces, channels, messages, users, and other group-based communication system objects are permitted to accumulate in state store 308, whether or not the group-based communication system objects are currently displayed in connection with the group-based communication system client interface. Storing all group-based communication systems in state store 308 has the benefit of being able to quickly respond to an arbitrary request to display a group-based communication system object at a group-based communication system client interface.

A need to display an arbitrary group-based communication system object (or other group-based communication system content) may arise when using a group-based communication system client interface in any number of contexts. For example, when a user of a group-based communication system client user interface is currently viewing the message contents of a particular group-based communication system channel, the user may choose to switch channels by simply clicking on or otherwise selecting a different group-based communication system channel. In this case, all of the messages that will fit within the currently displayed window will need to be accessed in order to display the messages. If the messages are currently present in state store 308, the messages can be readily displayed by client user interface 304. On the other hand, if the messages that need to be displayed are not in state store 308, a request will need to be made to a corresponding group-based communication system to retrieve, from an associated group-based communication system repository, the necessary objects, i.e. the group-based communication system messages in the group-based communication system channel.

To the extent that an entire corpus of group-based communication system objects (and other content) to which a user of a group-based communication system user interface has permissions, it is advantageous to store all of the associated data in state store 308. Similarly, as new group-based communication system objects are created in the group-based communication system, such new objects can advantageously be sent, for example, by way of real-time events to the group-based communication system client and stored in state store 308. Similarly, if any change is made in the group-based communication system back-end, such as if an existing message is edited, it is advantageous for a real-time event to be sent to the group-based communication system client application so that state store 308 may be correspondingly updated. The benefit of having a full user-accessible corpus of group-based communication system content in state store 308 is that regardless what a user wants to access by switching channels or switching workspaces or searching for any group-based communication system object that the user has access to, such content will be in state store 308 and the user interface can provide immediate access to the content.

Once the volume of group-based communication system content becomes too large to be stored in state store 308 and/or the volume of incoming real-time messages becomes so high as to exceed an ability of process 302 to timely handle all incoming events without introducing disruptive interactive delays that negatively impact user experience, a user experiences perceivable performance degradations such as slowdown or lag. In many real-world use cases, it is not possible to store all group-based communication system objects and to process in actual real-time all real-time events associated with all of the workspaces, channels, and users that a particular user has access to. As state store 308 begins to grow past a certain size, reducer 310 may consume too much memory or processor resources to keep up, which may result in unacceptable interactive response time or even in a crash of the client application. The above client application is described in connection with a single process 302; however, in some embodiments, client application processing may be distributed over an arbitrary number of processes similar to process 302 as depicted by processes 312 and 314.

In order to provide an optimal user experience, it is desirable for substantially all group-based communication system objects that a user needs to access to be present in state store 308 and to receive updates as soon as possible for those objects that a user is currently using or is likely to soon need. In order to determine which objects to prioritize, machine learning methods may be applied to predict which objects should be stored and which objects may be discarded from state store 308. Similarly, it is desirable to determine which real-time events should be pushed from the group-based communication system out to a particular client application.

In some embodiments, as a user uses a client application, statistics regarding the resources consumed are logged in a back end system associated with the group-based communication system, or in a logging subsystem of the client application. Such statistics may include a number of workspaces that the client application is connected to, a number of channels within each workspace that the user has access to, a number of messages in each channel and an overall size associated with the content of the messages and other group-based communication system objects in each of the channels. In addition, statistics regarding internals of the client application are logged at the group-based communication system back end, including a rate of real-time events received at the client application and a size of state store 308. Adverse performance events associated with the client application such as crashes or slow interactive response times are then stored in connection with the logs so that correlations with application parameters are mapped to adverse performance events. In some embodiments, characteristics regarding the client device on which the client application is being run are stored as well.

For example, a group-based communication system may log that a particular client application is being run on a particular model of a user device running a certain version of an operating system having a certain amount of system memory, with a percentage of the memory in use and a particular percentage of processor load. With this computer system background information, parameters such as a current size of state store 308 and rate of incoming real-time events can correlate to adverse performance events. In some embodiments, an adverse event will be defined as a client application that ceases to respond to real-time events, such as a crash or a client application that begins to demonstrate an interactive response time that takes a factor of time longer than previous similar interactions. For example, the factor may be chosen to be a factor of five and the interaction may be a keystroke interaction or a channel switch time. In this particular example, an adverse performance event will be declared if an initial channel switch takes 200 milliseconds to perform and either state store 308 grows to a certain size and/or the real-time events start coming in at a sufficient rate that a subsequent channel switch takes over a second for the associated data to be accessed and rendered at the portion of the client user interface that is visible to the user.

Based on logs of collected application state information correlated to adverse application performance events, a machine learning model may be trained. In some embodiments, such a machine learning model may be based on linear classification methods. In some embodiments the machine learning model is updated continually and used to predict which information will be requested by the client application. In this embodiment, group-based communication system objects that are predicted to be requested soon by the client application may be pushed out to the client application, proactively in the form of updates implemented as real-time events.

Such log data may also include raw statistical information regarding general characteristics of connected group-based communication system clients, such as rates of received real-time events and sizes of various internal event queues and application stores associated with the group-based communication system client. Such log data may also include statistics regarding which channels a particular user or cohort of users accesses, how frequently such channels are accessed, and for how long.

In addition to raw statistical information, various computed metrics may be calculated and stored. Such computed metrics may include propensity scores reflecting a likelihood that a particular user within a cohort of similar users will need to access a particular group-based communication system object. In some embodiments, a propensity score is based on usage rates per user per day of a group-based communication system object. In some other embodiments, a propensity score is weighted based on characteristics of the user such as the size of the workgroup to which the user belongs and whether the user is a commercial user (associated with an enterprise) or a social user (associated with a non-commercial organization). In some embodiments, a propensity score associated with group-based communication system users and content within a channel is based upon a channel history of which user created the channel and how recently a user joined a channel.

In some embodiments, a group-based communication system may provide different bundles of updated client code to be run on the client application depending on a prediction of the group-based communication system content that is anticipated to be needed by the user. In these embodiments, a group-based communication system client application is implemented as an application that executes within a web browser rendering engine in connection with a runtime library, such as Node.js. Depending on whether certain portions of the user interface are predicted for a certain user to be more important than other portions, various updated templates, code, and markup may be transmitted from a group-based communication system to the web browser rendering engine.

In addition to predicting when customer client applications may encounter adverse performance events, the present teachings may also be employed to predict when one or more potential code updates may increase the likelihood of future adverse performance events or general performance regressions to occur. In some embodiments, an operator of a group-based communication system will develop new features in the group-based communication system. Similarly, bug fixes and performance enhancements will be implemented by developers who develop software for the operator of the group-based communication system. In some cases, operators of a group-based communication system will employ teams of developers to develop software implementing a group-based communication system. The team of developers may employ test-based development techniques, whereby substantially all significant features associated with the group-based communication system have associated tests. As features are updated and new features are added, corresponding tests are implemented. As part of the code building process, the implemented tests are run against the new and updated features. In some embodiments, machine learning model predictions may be incorporated into the feature tests, so that, as part of the feature tests, a prediction can be made as to whether the new or updated features will increase the likelihood of any particular cohort of users to encounter an adverse performance event.

In another embodiment, operators of group-based communication systems run automated simulations of new builds of future versions of group-based communication system client applications. In these embodiments, log data corresponding to adverse performance events or log data that took prior versions of certain client applications close to encountering an adverse performance event may be injected into a simulation of a new version release candidate of a client application to see whether the new version encounters an adverse performance event in a simulation. If the release candidate performs well, it can be released. If a release candidate fails, those developers contributing code can be notified to take corrective action.

Turning now to FIG. 3B, a user interface 350 is depicted for carrying out embodiments of the invention. User interface 350 depicts a group-based communication system client user interface viewing a channel in a group-based communication system for collaboration among a group of users (also known as members of the channel). Users of the group-based communication system can post messages at any point in time, and other members can view them at their leisure, either in real-time or when they next visit the particular channel of the group-based communication system. This has the advantage that users can focus on particular tasks without being distracted by the need to constantly monitor real-time communications.

As depicted, user interface 350 includes a navigation pane 352 for navigating the group-based communication system. For example, navigation pane 352 may include an organization label 354 with one or more workspace labels to allow the user to switch between different organizations using the group-based communication system and different workspaces within an organization. For example, a user may belong to one instance of the group-based communication system associated with their employer and a second instance associated with a volunteer organization to which the user belongs. Within the employer's organization, separate workspaces may exist for product development and product support. The user can switch between organizations by clicking on the organization label 354 and switch between workspaces with the selected organization using workspace labels 356. Finally, within a workspace, communications may be divided up into channels, with each channel devoted to a particular topic. In some embodiments, user interface 350 includes channel list 358 to which the user has subscribed or to which the user has access, and the user can switch the current channel view to any channel by selecting that channel in the list. In some embodiments, channel list 358 may provide an indication that a particular channel (or channels) contains unread messages or messages that contain updates or updated thread(s) associated with a particular message. Thus, navigation pane 352 allows a user to easily select a channel across different organizations and workspaces. In addition to and optionally below channel list 358 may be presented a list (not shown) of direct message communication channels between one or more users of the group-based communication system. For the purposes of the present disclosure, a direct message communication channel functions analogously to a channel with members individually and manually specified by an initiating user.

User interface 350 also includes channel display 366. Channel display 366 includes information relevant to the user's currently selected channel. For example, channel display 366 may include channel header 360, which displays metadata for the currently selected channel, including channel name, channel membership, and channel topic. Channel header 360 may also include controls 362 and 364 for adding new members to the channel, displaying additional information about the channel, administering the channel, or other channel functions. In some embodiments, controls 362 and 364 may be located elsewhere in channel header 360. In some embodiments, channel display 366 displays the messages posted in the channel by the members of the channel, notifications for the channel, and other channel data. As depicted, channel display 366 shows the most recent messages posted by channel members; however, in some embodiments, messages may be searchable, sortable, and/or scrollable within channel display 366. Finally, channel display 366 may include a message input box 368 allowing users to post messages to the message display for communication to other channel members.

By way of illustration, a measure of channel switch latency is calculated from a point in time when a user of the group-based communication system client interface selects a new channel from channel list 358 until user interface 350 is completely refreshed with new channel contents fully rendered within channel display 366. Further, a measure of interactive keystroke latency is calculated from a time that a user of the group-based communication system client interface inputs a keystroke with message input box 368 in focus until which time a corresponding character is rendered within message input box 368. Another measure of user experience latency is an amount of time before a hover box is displayed when, for example, a user causes a cursor to hover over a channel name. This may occur, for example, in embodiments where hovering over a channel name in channel list 358 may provide additional information regarding the channel.

Figure 4:
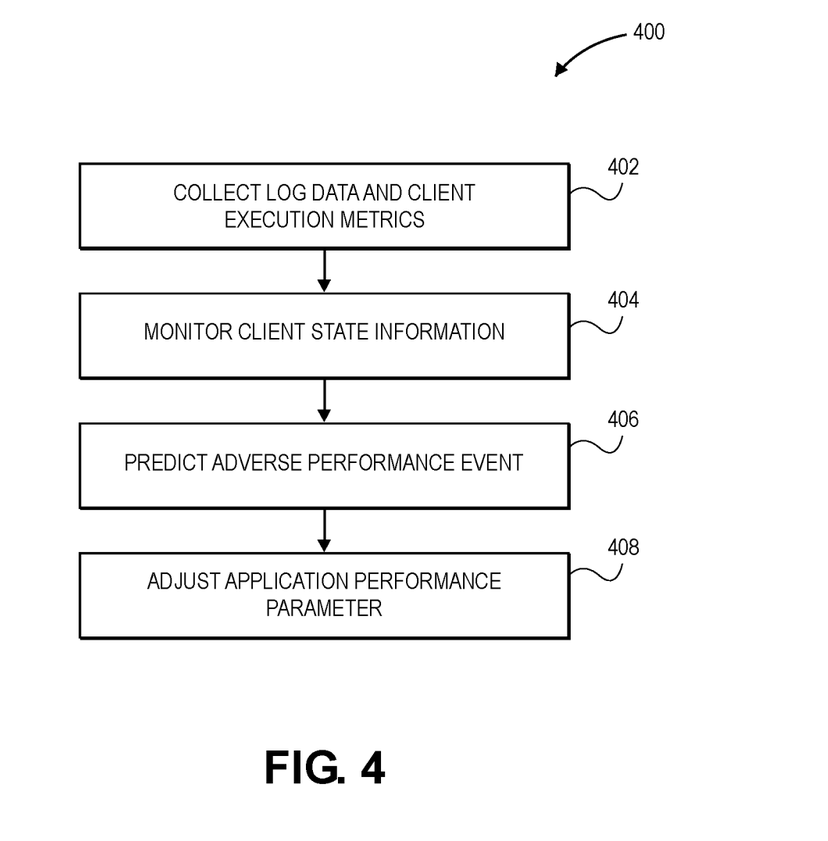
FIG. 4 depicts an exemplary flow chart for illustrating the operation of a method in accordance with one embodiment of the invention.

Turning now to FIG. 4, an exemplary flowchart for illustrating the operation of a method in accordance with one embodiment of the invention is depicted and referred to generally by reference numeral 400. In some embodiments, back-end group-based communication systems continually receive a multitude of statistics regarding the use of group-based communication system clients. In some embodiments, such statistics relate to computational or memory resources consumed within corresponding client devices as well as a number of organizations and/or workspaces to which a particular client application is connected, a number of channels within each workspace the particular user has access to, a number of messages in each channel, and an overall size associated with the content of the messages and other group-based communication system objects in each of the channels to which the user has access. In addition, statistics regarding: (i) rates of real-time events received at various client applications; and (ii) sizes, over time, of internal state stores as the group-based communication system clients execute and interact with the group-based communication system. Statistics regarding adverse performance events are also received at the group-based communication system, such as when client interactive response times exceed a predetermined threshold or when a group-based communication system client crashes, as determined by the group-based communication system client ceasing to respond to real-time events or otherwise to communicate with the group-based communication system. Alternatively or in addition, data may be collected, and machine-learning models trained, entirely at the client device.

At step 402, upon receiving the various client statistics, which are logged in group-based communication system logs as described above, associated log data and client execution metrics are collected. In some embodiments, such log data includes general information regarding client devices, which attach to group-based communication systems, such general information including hardware specifications of connected client devices, operating system and browser versions as well as the amount of free memory on a particular client device and processor percentage utilization. Similarly, client application statistics and prior execution metrics such as rates of incoming real-time events and sizes of application state stores are collected and correlated to prior encounters of adverse performance events such as lagging interactive responses and/or client application crashes. In some embodiments, the prior metrics are used to train machine learning models such that the trained machine learning models can be used to predict future adverse performance events.

Next, at step 404, client state information is monitored with respect to application state of a particular running group-based communication system client application. In some embodiments, a group-based communication system continually performs updated training on machine learning models associated with predictions of encountering adverse performance events. These machine learning models may then be pushed out to group-based communication system clients by way of real-time events, for example, or a real-time event may be pushed with a notification that a new model is available to be retrieved.

In some such embodiments, the group-based communication system client application may itself monitor its own application state information against a machine learning model as generated by a back-end group-based communication system. In some other embodiments, a machine learning model may be trained exclusively within the group-based communication system client application with optional periodically received parameters associated with prior metrics of other group-based communication system client applications. In this way the model used by a group-based communication system client application will be up-to-date and closely tailored to the specifics of the particular group-based communication system client application user.

In some alternative embodiments, machine learning models are periodically trained with aggregated prior metrics associated with a plurality of group-based communication system client applications as they interact with a particular group-based communication system. In these embodiments, the machine learning models may be utilized at the back-end servers associated with a group-based communication system, thereby obviating any need to transmit the models to a group-based communication system client application.

Next, at step 406, one or more adverse performance events are predicted and application metrics are mapped to performance outcomes based on trained machine learning models. As noted above, the machine learning models associated with the prediction of adverse performance events may be trained either within a back-end server, wholly within the execution environment of the client application, within the client application with optional back-end calculated parameters, or a combination thereof. Regardless where the machine learning models are trained and/or applied, the machine learning models provide an indication of a propensity of a client application to encounter an adverse performance event. Such predicted indications may also specify whether such an adverse performance event will be encountered within a specified period of time based on client state information such as current rate of incoming events, size of application state stores, number of active organizations and/or workspaces, and total size of group-based communication system objects accessed, stored, and/or processed by the group-based communication system client application.

Next, at step 408, application performance parameters are adjusted responsive to a determination of a future outcome for the adverse performance event. Future outcomes associated with adverse performance events may be impactful or non-impactful, meaning that adjustments of application performance parameters in response to adverse performance events may or may not impact a user experience for a user of a group-based communication system client application. An example of a non-impactful outcome of an adjustment of a client application performance parameter would be that a group-based communication system client application would not receive real-time updates for messages to a channel that the user is not currently viewing and is not likely to access in the immediate future.

As noted above, where performance is not a concern, it is convenient to receive all available real-time events from a group-based communication system for any group-based communication system object that a particular user could ever conceivably want to access. However, when it is not possible to receive and store everything from a group-based communication system that a particular user has access to, it is preferable to adjust client application performance parameters so that such adjustments do not have an impactful outcome with respect to user experience. In some embodiments, adjusting a client application performance parameter involves degrading an outcome for the user in such a way that it is not impactful to the user. For example, where a client application state store has grown to a size that performance of the group-based communication system client application has begun to (or soon will) negatively impact user experience, contents of the state store may be discarded where the particular contents are associated with group-based communication system content that is unlikely to be needed by the user. In the unlikely event that the discarded data is indeed needed by the user, the discarded data will be retrieved again from an underlying group-based communication system. However, the risk that such data will need to be retrieved is outweighed by the benefit of being able to provide a non-impactful outcome for the user based on the prediction, facilitated by the machine learning model, that the user will not need the discarded data. In this way, adjusting the client application performance parameter based on mapping prior application performance metrics to performance outcomes enables embodiments of the invention to adjust client application performance parameters so as to degrade certain application features without impacting user experience.

In some embodiments, for example, when a machine learning model is executed within a group-based communication system client application directly, the client application may predict that certain data from a group-based communication system will soon be needed. Such a prediction may correspond to the reception of a new message in a channel that the user is not currently viewing. In particular, reception of a new message that mentions the user in a not-currently-viewed channel may result in a desktop notification to the user that the user has been mentioned in a message in the not-currently-viewed channel. Based on prior metrics on which the machine learning model was trained, the machine learning model may predict that such an occurrence will lead to the user performing a channel switch to that channel. In the event that the not-currently-viewed channel is not already contained in a corresponding application state store, the client application may prefetch all messages or a subset of messages likely to be viewed from the not-currently-viewed channel in anticipation of the user performing a channel switch to the not-currently-viewed channel. In general, based on a prediction from a machine learning model, a group-based communication system client application may prefetch any group-based communication system object that the machine learning model predicts may soon need to be provided to a user in anticipation of future access.

In some embodiments, for example when a group-based communication system client application is initially connected to a group-based communication system with an empty (or otherwise flushed) state store, the client application may not have sufficient information to determine which group-based communication objects to initially request from the server. In some embodiments, the client application will load the first listed (or last used) organization and/or workspace with a corresponding list of channels. In some embodiments, the client application may not download any actual channel content, until a user selects a channel or a direct message thread to display. In some embodiments, when a client application requests a list of channels corresponding to a particular workspace, a responding group-based communication system may respond to the client application with parameterized data. Such parameterized data may be parameterized with a propensity score, for example. A propensity score may relate to a predicted likelihood that a particular user will need the parameterized data. For example, when a client application requests the list of channels corresponding to a workspace, in connection with each channel, the responding group-based communication system may respond with a parameter that is a propensity score predicted by a machine learning model that each of the channels will be selected by a particular user, either based on prior use metrics of the particular user or prior user metrics of other users. In one embodiment, the propensity score parameters are modeled by the machine learning models as prior usage rates. In this embodiment, the channels are ranked by propensity score based on the channels with the highest usage rates either by the particular user, by other users, or by a weighted combination of both the particular user and other users of a similar cohort.

In some embodiments, based on a periodically updated machine learning model, a group-based communication system predicts which group-based communication system content should be sent to a client application in anticipation of future access of the content based on propensity scores predicted by the machine learning model. In these embodiments, updates to data with relatively low propensity scores may be suppressed from a stream of real-time events sent to a client application. The client application only receives predicted low-propensity information regarding associated group-based communication system content when the client application specifically requests such information. In these embodiments, the group-based communication system also uses associated machine learning models to prioritize higher-propensity data so that where the machine learning models predict that group-based communication system content is likely to soon be needed by the client application, the group-based communication system will proactively push out the data to the client application, for example by transmitting real-time events to the client application in anticipation of future access by a user of the client application.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method for optimizing performance of a running application in connection with a group-based communication system, the method comprising:
    collecting log data relating to prior performance of the running application in connection with the group-based communication system;
    monitoring application state information regarding an application state of the running application;
    based on the application state information and a machine-learning model, predicting a future performance event that will impact the running application,
    wherein the machine-learning model maps one or more application metrics to one or more performance outcomes and is trained based on collected information associated with the log data; and
    responsive to determining a first data object associated with an impactful outcome of the future performance event and a second data object associated with a non-impactful outcome of the future performance event, discarding the second data object associated with the non-impactful outcome of the future performance event while maintaining the first data object associated with the impactful outcome of the future performance event.

2. The non-transitory computer-readable media of claim 1, wherein the one or more application metrics comprise:
    a rate of incoming real-time messages received by the running application; and
    a size of an application data store associated with the application state for rendering application details associated with the group-based communication system.

3. The non-transitory computer-readable media of claim 1, wherein at least a part of the machine-learning model is periodically updated by the group-based communication system and transmitted to the running application to facilitate the running application in discarding the second data object associated with the non-impactful outcome of the future performance event.

4. The non-transitory computer-readable media of claim 3, the method further comprising:
    prefetching one or more group-based communication system objects from the group-based communication system based on the machine-learning model in anticipation of future access of the one or more group-based communication system objects by a user of the running application.

5. The non-transitory computer-readable media of claim 1, wherein the machine-learning model is periodically updated and utilized by the group-based communication system to parameterize data provided to the running application in response to the running application requesting one or more group-based communication system objects.

6. The non-transitory computer-readable media of claim 5, wherein the data provided to the running application is parameterized based on prior usage rates of data previously requested by one or more users of the group-based communication system.

7. The non-transitory computer-readable media of claim 1, wherein the machine-learning model is periodically updated and utilized by the group-based communication system to facilitate prioritizing data to be pushed to the running application in anticipation of future access of a group-based communication system object by a user of the running application.

8. A method for optimizing performance of a running application in connection with a group-based communication system, the method comprising:
    collecting log data relating to prior performance of the running application in connection with the group-based communication system;
    monitoring application state information regarding an application state of the running application;
    based on the application state information and a machine-learning model, predicting a future performance event that will impact the running application,
    wherein the machine-learning model maps one or more application metrics to one or more performance outcomes and is trained based on collected information associated with the log data; and
    responsive to determining a first data object associated with an impactful outcome of the future performance event and a second data object associated with a non-impactful outcome of the future performance event, discarding the second data object associated with the non-impactful outcome of the future performance event while maintaining the first data object associated with the impactful outcome of the future performance event.

9. The method of claim 8, wherein the one or more application metrics comprise:
   a rate of incoming real-time messages received by the running application; and
   a size of an application data store associated with the application state for rendering application details associated with the group-based communication system.

10. The method of claim 8, wherein at least a part of the machine-learning model is periodically updated by the group-based communication system and transmitted to the running application to facilitate the running application in discarding the second data object associated with the non-impactful outcome of the future performance event.

11. The method of claim 8, further comprising:
   prefetching one or more group-based communication system objects from the group-based communication system based on the machine-learning model in anticipation of future access of the one or more group-based communication system objects by a user of the running application.

12. The method of claim 8, wherein the machine-learning model is periodically updated and utilized by the group-based communication system to parameterize data provided to the running application in response to the running application requesting one or more group-based communication system objects.

13. The method of claim 12, wherein the data provided to the running application is parameterized based on prior usage rates of data previously requested by one or more users of the group-based communication system.

14. The method of claim 13, wherein the machine-learning model is periodically updated and utilized by the group-based communication system to facilitate prioritizing data to be pushed to the running application in anticipation of future access of a group-based communication system object by a user of the running application.

15. A system comprising at least one processor and at least one non-transitory memory storing computer executable instructions that when executed by the at least one processor cause the system to carry out actions comprising:
   collecting log data relating to prior performance of a running application in connection with a group-based communication system;
   monitoring application state information regarding an application state of the running application;
   based on the application state information and a machine-learning model, predicting a future performance event that will impact the running application,
   wherein the machine-learning model maps one or more application metrics to one or more performance outcomes and is trained based on collected information associated with the log data; and
   responsive to determining a first data object associated with an impactful outcome of the future performance event and a second data object associated with a non-impactful outcome of the future performance event, discarding the second data object associated with the non-impactful outcome of the future performance event while maintaining the first data object associated with the impactful outcome of the future performance event.

16. The system of claim 15, wherein the one or more application metrics comprise:
   a rate of incoming real-time messages received by the running application; and
   a size of an application data store associated with the application state for rendering application details associated with the group-based communication system.

17. The system of claim 15, wherein at least a part of the machine-learning model is periodically updated by the group-based communication system and transmitted to the running application to facilitate the running application in discarding the second data object associated with the non-impactful outcome of the future performance event.

18. The system of claim 15, the actions further comprising:
   prefetching one or more group-based communication system objects from the group-based communication system based on the machine-learning model in anticipation of future access of the one or more group-based communication system objects by a user of the running application.

19. The system of claim 15, wherein the machine-learning model is periodically updated and utilized by the group-based communication system to parameterize data provided to the running application in response to the running application requesting one or more group-based communication system objects.

20. The system of claim 19, wherein the data provided to the running application is parameterized based on prior usage rates of data previously requested by one or more users of the group-based communication system.

\* \* \* \* \*